United States Patent [19]

Ewan

[11] Patent Number: 5,893,451

[45] Date of Patent: Apr. 13, 1999

[54] CATENARY BELT SUPPORT MECHANISM

[75] Inventor: James Ewan, Los Altos, Calif.

[73] Assignee: SRC Vision, Inc., Medford, Oreg.

[21] Appl. No.: 08/802,247

[22] Filed: Feb. 19, 1997

[51] Int. Cl.⁶ .................................................. B65G 31/00
[52] U.S. Cl. ........................................ 198/641; 209/939
[58] Field of Search ................................. 198/638, 639,
198/640, 641, 842, 606, 607, 626.1; 209/524,
546, 644, 939

[56] References Cited

U.S. PATENT DOCUMENTS

| | | | |
|---|---|---|---|
| 2,857,041 | 10/1958 | Preston | 198/641 X |
| 5,632,370 | 5/1997 | Grathoff | 198/607 X |
| 5,713,456 | 2/1998 | Haimberger et al. | 198/641 X |

OTHER PUBLICATIONS

Brochure of Key Technology, Inc. describing Automated Inspection Systems, p. 36.
Brochure of Key Technology, Inc. entitled, "The Future is Here With Tegra™ from Key."
Brochure of Key Technology, Inc. describing IntelliSort™ technology.

*Primary Examiner*—James R. Bidwell
*Attorney, Agent, or Firm*—Stoel Rives LLP

[57] ABSTRACT

A catenary conveyor belt support is provided in a conveyor system for automated bulk processing equipment. The conveyor belt launches bulk articles along a trajectory from one end to a processing station. The upper surface of the conveyor belt at one end thereof is angled with respect to a horizontal plane and determines the launch angle of the trajectory along which the articles travel. The support holds constant the catenary shape of the belt and, thus, the launch angle of the trajectory regardless of the load thereon.

8 Claims, 3 Drawing Sheets

CATENARY BELT SUPPORT MECHANISM

TECHNICAL FIELD

The present invention relates to conveyors for automated bulk processing equipment and, in particular, to a support mechanism for such conveyor.

BACKGROUND OF THE INVENTION

Automated bulk optical processing equipment can perform a variety of tasks such as, for example, inspection or sorting bulk articles including raw or processed fruit, vegetables, wood chips, recycled plastics and other similar products. The articles may be characterized according to size, color, shape or other qualities. Modern bulk optical processing equipment can rapidly separate very large quantities of articles into numerous categories.

Such equipment typically includes a conveyor belt that moves the articles past an inspection station where cameras or other detection devices examine the articles. The inspection station sends signals to a sorter or treatment station where the articles are sorted or otherwise treated by category. For example, defective or foreign articles may be removed from the flow of articles carried by the conveyor belt. Frequently, unacceptable articles are removed by directing an accurately timed blast of fluid, such as compressed air, at the article as it is projected from the conveyor belt in order to direct it out of the process flow. Separation takes place at a location in the transport system where the articles are unsupported so that defective articles can easily be removed from the stream. Acceptable articles are collected in a product outfeed location such as a product outfeed chute, while unacceptable articles are directed into a reject outfeed chute.

One type of system can be seen in FIG. 1 in which a processing system 10 employs a continuous conveyor belt 12 hung between an upper drive roller 14 and a lower end roller 16 so that the conveyor belt 12 has a catenary shape. Articles 18 are transferred to an upper surface 20 of the conveyor belt 12 from an infeed chute (not shown) at or near the drive roller 14. The slope of the conveyor belt 12 helps stabilize the articles 18 by centrifugal force as the articles 18 approach the end roller 16. The velocity of the articles 18 near the end roller 16 is approximately the same as the velocity of the conveyor belt 12. The articles 18 are launched from the conveyor belt 12 at the end roller 16 along a trajectory 22 past an inspection station 24 and an ejector 26 where the articles 18 are processed.

The articles are processed by directing an accurately timed blast of fluid, such as compressed air, at unacceptable articles as they are projected along their trajectory 22. The fluid is directed within a plane 28 through which the articles 18 travel. The time it takes the articles 18 to reach the plane 28 is determined by the angle of the trajectory 22. The trajectory 22 is slightly inclined from a horizontal plane 30 and forms an angle 32 therewith. Thus, the trajectory 22 of the articles 18 is prescribed by the angle of launch and the velocity of the articles 18.

The trajectory 22 lies in a plane extending from the belt surface near the end roller 16. Thus, the angle 32 of the trajectory 22 is dependent upon the position of the belt surface immediately adjacent the end roller 16. The position of the belt surface adjacent the end roller 16 is determined by the "sag" of the load-bearing top portion 34 of the conveyor belt 12 when it is suspended between the drive roller 14 and end roller 16. The amount of "sag" is dependent upon the fraction of the total length of the conveyor belt 12 that constitutes the load-bearing top portion 34 of the conveyor belt 12. If the conveyor belt 12 is lightly loaded as shown in solid lines in FIG. 1, a tensioning roller 36 bears upon a top surface 38 of a bottom portion 40 of the conveyor belt 12 and restricts the amount of the conveyor belt 12 that constitutes the load-bearing top portion 34. Thus, the "sag" of the conveyor belt 12 is minimal and the angle 32 is small producing a slightly inclined trajectory.

However, as the conveyor belt 12 becomes more heavily loaded with articles 18 as seen in phantom in FIG. 1, a greater portion of the conveyor belt 12 slides around the drive roller 14 and end roller 16 so that the "sag" increases. As the "sag" increases, so does the angle of the conveyor belt 12 producing a greater trajectory angle 32.

This variability of the trajectory angle has a detrimental effect upon the quality of the sort. The location of the linear field of view of the inspection station 24 is fixed as is the pattern of the air streams from the ejector 26. The in-air transit time of the articles 18 between the field of view of the inspection station 24 and the plane 28 of air streams from the ejector 26 is a critical parameter for effective sorting. Since the time of transit, location, and direction of the articles 18 at the plane 28 of the ejector 26 is highly dependent upon the angle of launch, a variable launch angle is undesirable.

SUMMARY OF THE INVENTION

It is an object of the present invention to provide an improved conveyor for use with automated bulk processing equipment.

Another object of this invention is to provide a conveyor that more accurately delivers bulk articles to a processor.

A further object of this invention is to control the trajectory along which the bulk articles travel to the processing station.

Still another object of this invention is to provide a support for the conveyor to increase its stability.

The present invention includes a support for stabilizing a catenary conveyor belt for an automated bulk processing equipment. The conveyor belt comprises a continuous belt hung between an upper drive roller and a lower roller. An upper portion of the belt receives bulk articles from an in-feed (not shown). The bulk articles are moved from the upper portion of the belt to a lower portion of the belt where they are delivered to a sorter that separates unacceptable articles from acceptable ones. The load-bearing top portion of the belt has a catenary shape that centrifugally stabilizes the articles on the belt. The articles are projected from the belt to the sorter along a trajectory that is determined by the catenary shape of the belt. The support maintains the catenary shape of the upper portion of the belt regardless of whether it is fully or partially loaded with the bulk articles.

In a preferred embodiment, the support is in the form of a plurality of rollers located underneath the load-bearing top portion of the belt. The rollers are mounted for free rotation to the conveyor housing and follow the catenary shape of the loadbearing top portion of the belt when it is unloaded. The rollers extend across the entire width of the belt and support the bottom surface of the load-bearing top portion of the belt to prevent it from sagging when loaded. The number of rollers required to support the belt may vary depending on the mass and quantity of the articles. The rollers may be spaced accordingly to maintain the catenary shape of the belt during processing of the articles. The constant shape of the catenary belt ensures an accurate projection of the articles along their trajectory.

Additional objects and advantages of this invention will be apparent from the following detailed description of a preferred embodiment thereof that proceeds with reference to the accompanying drawings.

DETAILED DESCRIPTION OF PREFERRED EMBODIMENT

Figure 1:
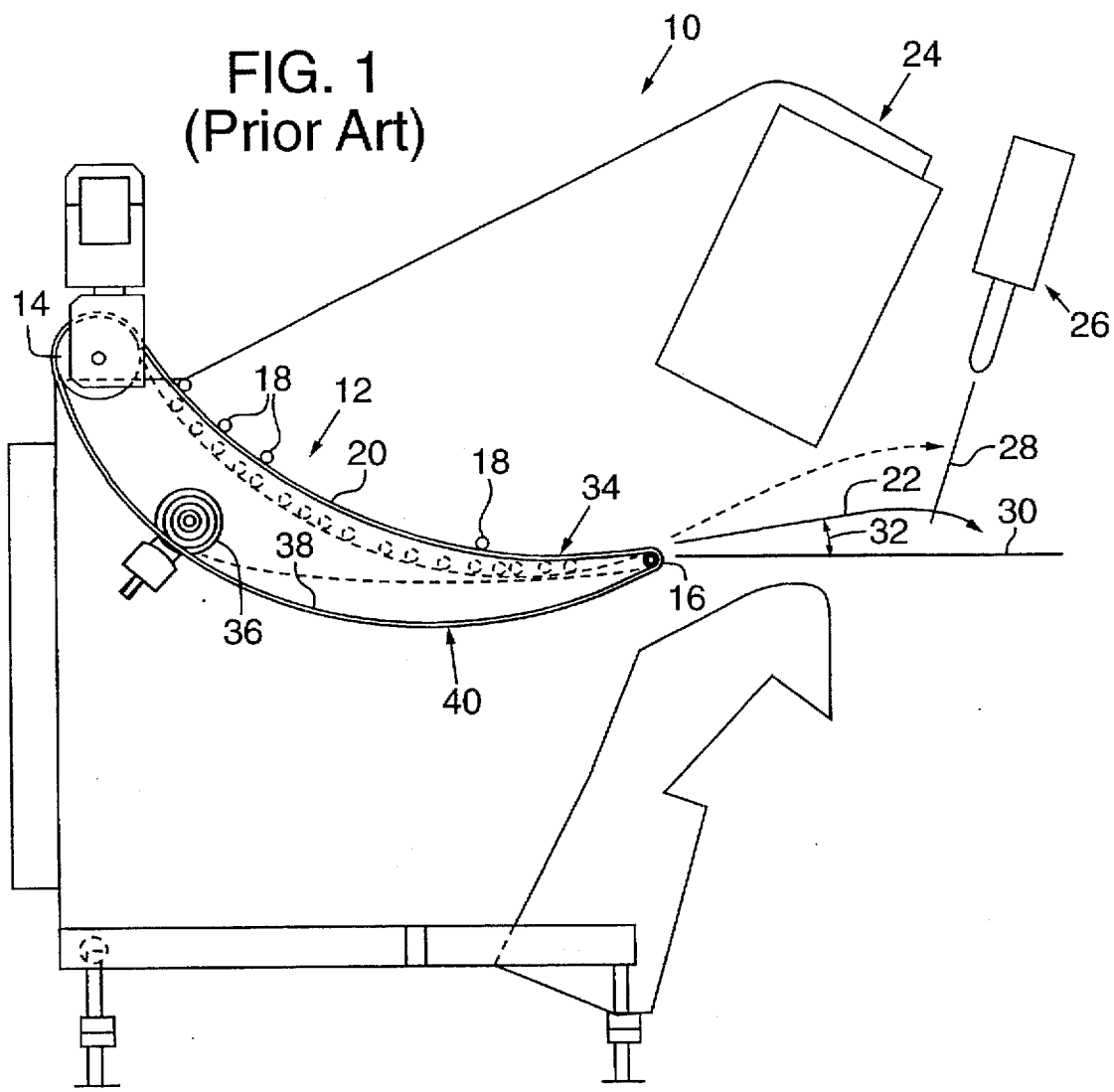
FIG. 1 is a schematic side elevation view of a prior automated bulk processing system with a catenary conveyor belt shown lightly loaded and heavily loaded.
Figure 2:
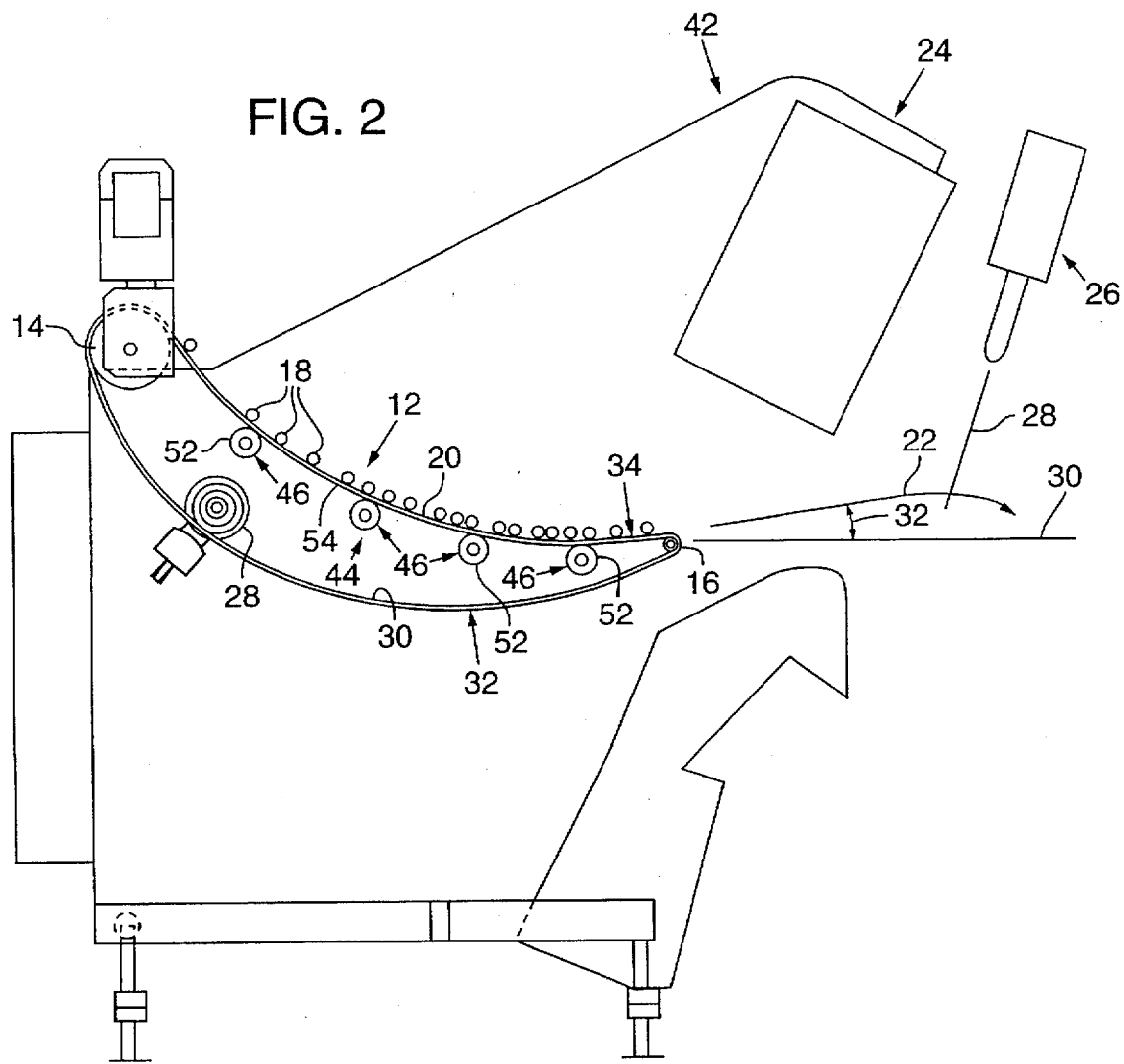
FIG. 2 is a schematic side elevation view of a conveyor system of the present invention with a support for the conveyor belt.

Referring to FIG. 2, an automated bulk processing system 42 according to the present invention is shown. The system 42 includes a conveyor belt 12 having a support 44 is shown in FIG. 2. The processing system 42 is similar to that seen in FIG. 1 in which corresponding parts have like reference numerals. The processing system 42 preferably inspects and sorts unacceptable articles from a flow of acceptable articles.

Articles 18 are delivered onto the belt 12 from an in-feed mechanism (not shown). The belt 12 forms a closed loop around an upper drive roller 14 and a spaced-apart lower end roller 16 to form a catenary shape. The slope of the belt 12 helps stabilize the articles 18 by centrifugal force as the articles 18 approach the end roller 16. When the articles 18 near the end roller 16 the velocity of the articles 18 is approximately the same as the velocity of the belt 12. The articles 18 are launched along a trajectory 22 to an inspection station 24 and an ejector 26 for processing. The inspection station 24 identifies selected optical characteristics of the articles 18 as they pass from the conveyor belt 12. Inspection station 24 can identify the preselected characteristics of the articles 18 in accordance with the methods and systems described in U.S. Pat. No. 5,085,325 of Jones et al. for Color Sorting System and Method, assigned to the assignee of the present application. Although inspection station 24 is shown as inspecting the articles 18 in-air, the conveyor system 10 may also employ an on-belt inspection station.

The inspection station 24 sends signals to the ejector 26 where the articles 18 are processed. The articles 18 are processed by directing an accurately timed blast of fluid, such as compressed air, at unacceptable articles as they are projected along their trajectory 22. The fluid is directed within a plane 28 through which the articles 18 travel. The time it takes the articles 18 to reach the plane 28 is determined by the predetermined angle 32 of the trajectory 22 with the horizontal plane 30. Thus, it is important that the angle 32 be constant so that the timing of the articles 18 from the belt 12 to the plane 28 of fluid is accurate. Since the trajectory angle 32 is determined by the angle between the upper surface 20 of the belt 12 and the horizontal plane 30, it is important to keep the belt 12 stable.

Figure 4:
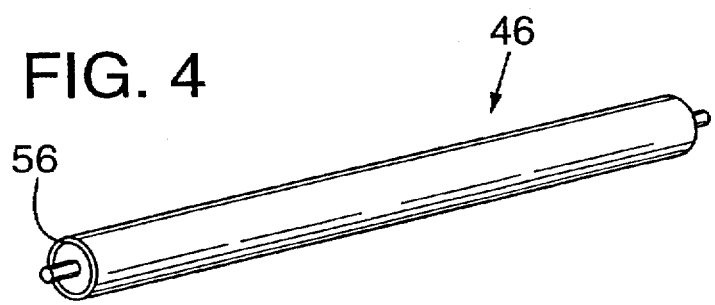
FIG. 4 is an isometric view of a support roller of the present invention.

The support 44 is located underneath the load-bearing top portion 34 of the belt 12 and has a catenary shape that follows the shape of the belt 12 when it is unloaded. Thus, the support 44 keeps the catenary shape of the belt 12 constant regardless of the load. In the preferred embodiment, the support 44 comprises a number of supporting members, preferably in the form of rollers 46 that are mounted at their ends in a housing 48 of the conveyor system 42 by bearings 50 for free rotation. The outer surface 52 of the rollers 46 engages a bottom surface 54 of the load-bearing top portion 34 of the belt 12 so that the rollers 46 rotate freely about their respective axes as the belt 12 is driven by the drive roller 14. The rollers 46 may have various forms and may be made of any desired material. For example, as seen in FIG. 4, the rollers 46 may be made of solid stainless steel or aluminum and may include an outer layer of rubber 56. Alternatively, the rollers 46 may be made entirely of rubber. Additionally, the rollers 46 may either be of solid material or hollow.

Figure 3:
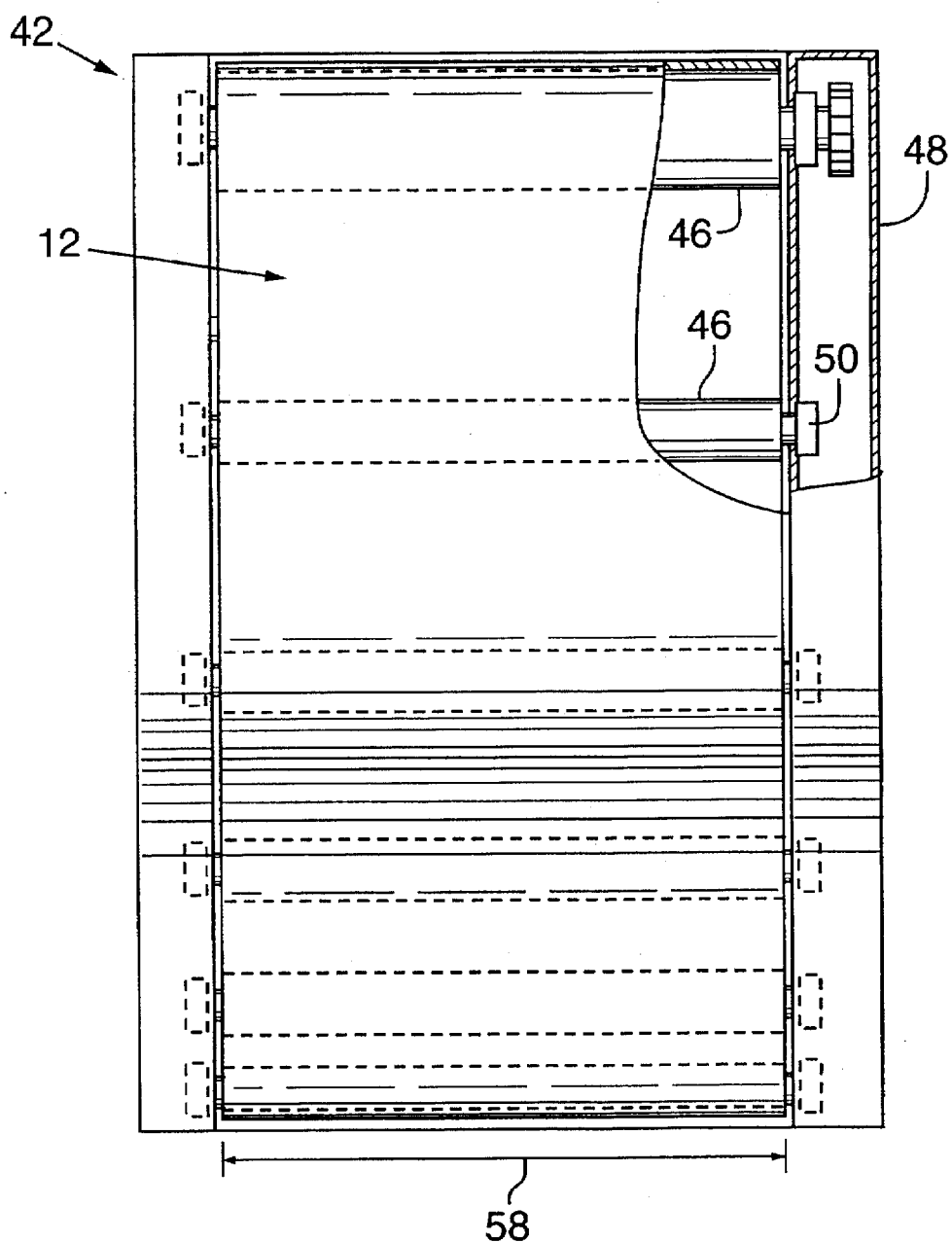
FIG. 3 is a schematic top plan view of the conveyor system of FIG. 2.

As seen in FIG. 3, the rollers 46 extend across the width 58 of the belt 12 to provide even support. For example, one belt commonly employed in such systems is available in widths of either fifty-nine inches (1.5 m) or twenty-nine and one-half inches (0.75 m). The number of rollers 46 may vary depending on factors, such as, for example, the length of the belt 12, the mass of the articles 18, and the number of articles 18 to be processed. As seen in FIG. 2, four rollers 46 are shown. However, more rollers 46 may be required for a longer belt 12. The spacing of the rollers 46 may vary depending on the load on the belt 12. Also, the mass and quantity of the articles 18 may determine the number of rollers necessary to maintain the catenary shape of the belt 12. For example, since lightweight articles cause less sagging of the belt 12, such belts used to process lightweight articles require a fewer number of rollers. Conversely, catenary belts used to process heavier articles require more rollers.

The articles 18 tend to collect near the lower end roller 16 due to the catenary shape of the belt 12 and would normally cause more sagging in this area. Therefore, the rollers 46 are spaced closer together near the lower end roller 16. Thus, the area of the load-bearing top portion 34 of the belt 12 that bears the most weight is more heavily supported. The most important aspect regarding the number of rollers 46 and their spacing is that they maintain the catenary shape of the belt 12 when it is loaded.

It is to be understood that the support 44 may have other forms, such as, for example, a sheet metal pan coated with a non-stick surface and formed in the catenary shape of the belt 12. Thus, various forms of support may be employed as long as it holds the catenary shape of the belt under a load.

While in the foregoing specification this invention has been described in relation to certain preferred embodiments thereof, and many details have been set forth for purposes of the invention, it will be apparent to one skilled in the art that the invention is susceptible to additional embodiments and that certain of the details described herein may be varied considerably without departing from the basic principles of the invention.

I claim:

1. In an automated bulk processing system that includes an article transport system and inspection and sorting stations for optical inspection and sorting of articles, the article transport system including a driven, continuous conveyor belt having a load-bearing surface, the inspection station including detection devices that examine the articles within a field of view, and the sorting station including ejectors that selectively direct along fluid stream paths ejection fluid streams timed in response to signals provided by the inspection station to deflect unacceptable articles from an airborne stream of the articles, the conveyor belt being hung between an upper end roller and a lower end roller so that the load-bearing surface in an unloaded condition sags to a nominal catenary shape, and the conveyor belt receiving multiple articles deposited proximal to the upper end roller, moving the articles toward the lower end roller, and centrifugally stabilizing the articles on the conveyor belt as they approach the lower end roller for launch along a trajectory, and the load-bearing surface of the conveyor belt in a loaded condition produced by the depositing of significantly heavy articles causes them to travel along unpredictable trajectories that prevent reliable position tracking of the articles as they travel past the ejection fluid stream paths of the ejectors and thereby adversely affect accurate and efficient processing, a method of providing a predictable trajectory for the articles, irrespective of their weights, to improve processing efficiency and accuracy as the articles undergo inspection and sorting, comprising:

determining for the load-bearing surface of the conveyor belt at a position adjacent to the end roller, an angular inclination produced by an amount of sag that centrifugally stabilizes the articles carried on the conveyor belt and that results in a launch angle of trajectory for the articles which provides operationally acceptable transit time and direction characteristics of the articles as they travel between the field of view of the detection devices and the ejection fluid stream paths; and supporting the conveyor belt at the position adjacent to the end roller to maintain the angular inclination and thereby keep substantially unchanged the launch angle of the trajectory irrespective of the weight of the articles so as to establish a predictable trajectory and enable reliable position tracking of the articles launched from the conveyor belt.

2. The method of claim 1 in which the conveyor belt has a bottom surface located opposite the load-bearing surface and in which the supporting the conveyor belt includes positioning a supporting member to engage the bottom surface of the conveyor belt.

3. The method of claim 2 in which the bottom surface of the conveyor belt has a width and in which the supporting member comprises a support roller that extends across the width of the bottom surface of the conveyor belt.

4. The method of claim 2 in which the bottom surface of the conveyor belt has a width and in which the supporting member comprises a stationary support that has a non-stick surface, has a shape and dimensions that maintain the angular inclination, and extends transversely of the width of the bottom surface of the conveyor belt.

5. The method of claim 4 in which the stationary support extends across the entire width of the bottom surface of the conveyor belt.

6. The method of claim 1 in which the inspection station is positioned such that the field of view of the detection devices intersects the load-bearing surface of the conveyor belt.

7. The method of claim 1 in which the inspection station is positioned such that the field of view of the detection devices does not intersect the load-bearing surface of the conveyor belt so that the position tracking takes place only while the articles are airborne.

8. The method of claim 1 in which the conveyor belt has a width and bottom surface located opposite the load-bearing surface, and in which the supporting of the conveyor belt includes positioning multiple support rollers in spaced-apart relation between the upper and lower end rollers to engage the bottom surface of the conveyor belt and in a direction to extend across the width of the bottom surface of the conveyor belt, and the support rollers positioned nearer to the lower end roller being more closely mutually spaced apart than the support rollers positioned nearer to the upper end roller.

\* \* \* \* \*